(12) United States Patent
Song et al.

(10) Patent No.: US 11,867,578 B2
(45) Date of Patent: Jan. 9, 2024

(54) HIGH-PRECISION AND MINIATURIZED ON-ORBIT CALIBRATION DEVICE FOR SIX-DIMENSIONAL FORCE SENSOR OF SPACE STATION MANIPULATOR AND CALIBRATION METHOD THEREOF

(71) Applicant: SOUTHEAST UNIVERSITY, Jiangsu (CN)

(72) Inventors: Aiguo Song, Jiangsu (CN); Shuyan Yang, Jiangsu (CN); Baoguo Xu, Jiangsu (CN); Yonghui Zhou, Jiangsu (CN); Qimeng Tan, Jiangsu (CN); Changchun Liang, Jiangsu (CN); Ming Wei, Jiangsu (CN); Chunhui Wang, Jiangsu (CN); Fan Li, Jiangsu (CN); Suinan Zhang, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 205 days.

(21) Appl. No.: 17/438,941

(22) PCT Filed: Feb. 1, 2021

(86) PCT No.: PCT/CN2021/074661
§ 371 (c)(1),
(2) Date: Sep. 14, 2021

(87) PCT Pub. No.: WO2021/190144
PCT Pub. Date: Sep. 30, 2021

(65) Prior Publication Data
US 2022/0307933 A1      Sep. 29, 2022

(30) Foreign Application Priority Data
Mar. 25, 2020   (CN) .......................... 202010216824.8

(51) Int. Cl.
*G01L 25/00* (2006.01)
*G01L 1/16* (2006.01)

(52) U.S. Cl.
CPC ................ *G01L 25/00* (2013.01); *G01L 1/16* (2013.01)

(58) Field of Classification Search
CPC ..... B25J 9/1692; B25J 19/0095; G01L 5/167; G01L 5/168; G01L 25/00
See application file for complete search history.

(56) References Cited

U.S. PATENT DOCUMENTS 3,663,107 A * 5/1972 Denis .................... G01B 11/303
356/600
4,132,318 A * 1/1979 Wang ..................... B25J 9/0015
414/21

(Continued)

FOREIGN PATENT DOCUMENTS

| CN | 101226095 | 7/2008 |
| CN | 101776506 | 7/2010 |

(Continued)

OTHER PUBLICATIONS

"International Search Report (Form PCT/ISA/210)" of PCT/CN2021/074661, dated May 7, 2021, pp. 1-5.

(Continued)

*Primary Examiner* — Tran M. Tran
(74) *Attorney, Agent, or Firm* — JCIP GLOBAL INC.

(57) ABSTRACT

The present invention discloses a high-precision and miniaturized on-orbit calibration device for a six-dimensional force sensor of a space station manipulator and a calibration method thereof, which include an inverted π shape fixing bracket, three force applying devices, and a cubic stress block. Each force applying device includes a force applying head, a single axis force sensor, a force source part and a fastening part. The force source part includes an upper (Continued)

support plate, a second electrode plate, piezoelectric ceramic plates, a first electrode plate and a lower support plate, which are coaxially arranged sequentially from top to bottom. The single axis force sensor is mounted on the top of the upper support plate, and the hemispherical force applying head is mounted on the top of the single axis force sensor. The cubic stress block is mounted on the top of the six-dimensional force sensor.

9 Claims, 3 Drawing Sheets

(56) References Cited

U.S. PATENT DOCUMENTS

| | | | |
|---|---|---|---|
| 4,292,835 A | 10/1981 | Bickford | |
| 4,620,436 A * | 11/1986 | Hirabayashi | B25J 9/1692 |
| | | | 73/1.15 |
| 5,020,357 A * | 6/1991 | Kovacevic | G01L 25/00 |
| | | | 248/419 |
| 5,220,261 A * | 6/1993 | Kempas | B25J 9/1692 |
| | | | 318/568.22 |
| 5,261,266 A * | 11/1993 | Lorenz | G01L 25/00 |
| | | | 73/1.15 |
| 5,996,412 A * | 12/1999 | Hansen | G01P 15/0915 |
| | | | 73/514.34 |
| 6,382,012 B2 * | 5/2002 | Hara | G01L 25/00 |
| | | | 73/1.15 |
| 6,418,774 B1 * | 7/2002 | Brogårdh | B25J 9/1692 |
| | | | 73/1.75 |
| 7,040,136 B2 * | 5/2006 | Forss | G01C 9/00 |
| | | | 73/1.75 |
| 7,380,434 B2 * | 6/2008 | Schmitt | F16M 11/14 |
| | | | 73/12.01 |
| 8,265,792 B2 * | 9/2012 | Wampler, II | B25J 15/0009 |
| | | | 700/254 |
| 8,467,901 B2 * | 6/2013 | Brogardh | B25J 9/1692 |
| | | | 700/254 |
| 8,726,740 B1 * | 5/2014 | Mekid | G01L 5/167 |
| | | | 73/862.041 |
| 9,481,089 B2 * | 11/2016 | Matsuzawa | G01L 5/009 |
| 9,551,639 B2 * | 1/2017 | Li | G01N 3/08 |
| 9,816,886 B2 * | 11/2017 | Inazumi | G01L 1/16 |
| 9,880,066 B2 * | 1/2018 | Larsen | G01L 5/16 |
| 10,126,186 B2 * | 11/2018 | Berme | G01L 5/1627 |
| 10,641,663 B2 * | 5/2020 | Chijioke | G01L 25/00 |
| 10,989,617 B2 * | 4/2021 | Ganguin | G04D 1/0028 |
| 11,554,506 B2 * | 1/2023 | Hwang | B25J 9/1692 |
| 2018/0128701 A1 * | 5/2018 | Lee | G01M 5/005 |
| 2018/0342666 A1 * | 11/2018 | Kanning | H10N 30/87 |
| 2022/0187971 A1 * | 6/2022 | Aloui | G01L 5/162 |

FOREIGN PATENT DOCUMENTS

| | | |
|---|---|---|
| CN | 104280187 | 1/2015 |
| CN | 104406736 | 3/2015 |
| CN | 105021390 | 11/2015 |
| CN | 109580089 | 4/2019 |
| CN | 111351615 | 6/2020 |
| DE | 19960482 | 6/2001 |
| JP | 2012176465 | 9/2012 |
| KR | 20110075727 | 7/2011 |

OTHER PUBLICATIONS

"Written Opinion of the International Searching Authority (Form PCT/ISA/237)" of PCT/CN2021/074661, dated May 7, 2021, pp. 1-5.

* cited by examiner

HIGH-PRECISION AND MINIATURIZED ON-ORBIT CALIBRATION DEVICE FOR SIX-DIMENSIONAL FORCE SENSOR OF SPACE STATION MANIPULATOR AND CALIBRATION METHOD THEREOF

CROSS-REFERENCE TO RELATED APPLICATION

This application is a 371 of international application of PCT application serial no. PCT/CN2021/074661, filed on Feb. 1, 2021, which claims the priority benefit of China application no. 202010216824.8, filed on Mar. 25, 2020. The entirety of each of the above mentioned patent applications is hereby incorporated by reference herein and made a part of this specification.

BACKGROUND

Technical Field

The present invention relates to a mechanical calibration device and a calibration method thereof, in particular to a high-precision and miniaturized on-orbit calibration device for the six-dimensional force sensor of a space station manipulator and a calibration method thereof.

Description of Related Art

As a kind of multi-degree-of-freedom actuators for space operations, the main tasks of space station manipulators include assisting docking, target handling, on-orbit construction, observation and monitoring of spatial objects, capturing and releasing of spatial objects, etc., and the space station manipulators are the main carriers for accomplishing on-orbit service and deep space exploration. The six-dimensional force sensor mounted on a space station manipulator is the most important sensor for sensing external information, and is the basis for achieving the above goals.

Calibration is an important link in the design of a force sensor, and is used to determine the performance indexes of the sensor. However, the performance of the sensor may change during long-term use. Therefore, it is necessary to repeat calibration regularly to ensure the accuracy and reliability of measurement. For the six-dimensional force sensor mounted on the space station manipulator, how to achieve on-orbit calibration is an urgent problem to be solved. The existing calibration devices for six-dimensional force sensors generally use weights for calibration, which cannot be used in the weightless environment of the space station. In addition, the existing calibration devices are large in size, and may result in problems such as high launch cost and narrow space station if they are applied in the space stations.

SUMMARY

To overcome the above-mentioned shortcomings of the prior art, the present invention provides a high-precision and miniaturized on-orbit calibration device for the six-dimensional force sensor of a space station manipulator and a calibration method thereof, which utilize piezoelectric ceramic plates and high-precision one-dimensional force sensors to generate standard load to realize on-orbit calibration in a weightless environment, and have the advantages of small size, large loads and stable force source, etc.

To solve the above-mentioned technical problems, the present invention employs the following technical solution:

A high-precision and miniaturized on-orbit calibration device for the six-dimensional force sensor of a space station manipulator includes a fixing bracket, three force applying devices and a cubic stress block.

The fixing bracket is in an inverted 7E-shape and includes a horizontal plate and two vertical plates vertically arranged on the horizontal plate; a calibration cavity with a U-shaped longitudinal cross section is formed between the two vertical plates and the horizontal plate.

The three force applying devices are respectively a first force applying device, a second force applying device and a third force applying device, which are all disposed in the calibration cavity. The first force applying device and the second force applying device are arranged on opposite sides of the two vertical plates respectively, and height positions of the first force applying device and the second force applying device on the corresponding vertical plates can be adjusted in vertical direction; the third force applying device is arranged at a center of a top surface of the horizontal plate.

Each force applying device includes a force applying head, a single axis force sensor, a force source part and a fastening part.

The force source part includes an upper support plate, a second electrode plate, piezoelectric ceramic plates, a first electrode plate and a lower support plate, which are coaxially arranged sequentially from top to bottom; the upper support plate is mounted on the lower support plate via the fastening part, and the second electrode plate, the piezoelectric ceramic plates and the first electrode plate are elastically compressed between the upper support plate and the lower support plate.

The single axis force sensor is mounted at a center of a top portion of the upper support plate, and the force applying head is mounted at a center of a top portion of the single axis force sensor and is hemispherical.

The cubic stress block is mounted on a top portion of the six-dimensional force sensor, and the six-dimensional force sensor is mounted at an end of the manipulator; the cubic stress block can be driven by the manipulator to extend into the calibration cavity and in contact with the three force applying heads in the three force applying devices; a precision of the single axis force sensor is higher than that of the six-dimensional force sensor.

Each vertical plate is provided with at least two mounting positions for force applying devices at different heights, wherein at least one set of mounting positions for force applying devices on the two vertical plates are at a same height.

Each vertical plate is provided with three mounting positions for force applying devices at different heights. The two vertical plates are respectively a left vertical plate and a right vertical plate, and the three mounting positions for the force applying devices on the left vertical plate are a mounting position A, a mounting position B and a mounting position C from top to bottom. The three mounting positions for the force applying devices on the right vertical plate are a mounting position a, a mounting position b, and a mounting position c from top to bottom; wherein the mounting position A, the mounting position B and the mounting position C are in a same vertical line, while the mounting position a, the mounting position b and the mounting position c are in another vertical line; heights of the mounting position a, mounting position b and mounting position c are in one-to-one correspondence with heights of the mounting position A, mounting position B and mounting position C.

The fastening part includes a bolt, a nut and a pre-loaded spring; a shank of the bolt passes through the pre-loaded spring, the upper support plate and the lower support plate sequentially from top to bottom, and then is fastened by the nut; the lower support plate is in a threaded connection with the shank of the bolt, the upper support plate is slidably connected to the shank of the bolt, and the pre-loaded spring is located between the upper support plate and the head of the bolt.

A high-precision and miniaturized on-orbit calibration method for the six-dimensional force sensor of a space station manipulator includes the following steps.

Step 1: calibrating the force in an X-direction including the following steps:

step 11: mounting the force applying devices: mounting an axis of a first force applying device and an axis of a second force applying device at a same height, and mounting a third force applying device at a center of a top surface of a horizontal plate;

step 12: mounting a cubic stress block: mounting the cubic stress block on a top of the six-dimensional force sensor, and mounting the six-dimensional force sensor at an end of the manipulator; driving the manipulator so that the cubic stress block extends into a calibration cavity and in contact with three force applying heads of the three force applying devices; at that point, the X-direction of the six-dimensional force sensor is subjected to be parallel to an axial direction of the first force applying device, and a Z-direction of the six-dimensional force sensor is subjected to coincide with an axial direction of the third force applying device;

step 13: calibrating a force in a positive X-direction: applying multiple groups of forces on the cubic stress block by controlling the first force applying device, logging a data of a single axis force sensor in the first force applying device and a data of the six-dimensional force sensor, thereby realizing the calibration of the force in the positive X-direction; wherein, a method for applying multiple groups of forces on the cubic stress block with the first force applying device is as follows: applying a preset voltage between a first electrode plate and a second electrode plate in the first force applying device, owing to a piezoelectric effect, several piezoelectric ceramic plates between the two electrode plates generate a preset displacement in the positive X-direction which is related with a magnitude of the voltage owing to a piezoelectric effect; since the force applying head in the first force applying device contacts the cubic stress block, the displacement in the positive X-direction will be transformed into the force in the positive X-direction applied on the cubic stress block, and a magnitude of the force in the positive X-direction is related with the magnitude of the voltage; the single axis force sensor in the first force applying device detects and feeds back the applied force in the positive X-direction, and the magnitude of the force in the positive X-direction can be adjusted by controlling the magnitude of the voltage; and step 14: calibrating a force in a negative X-direction: resetting the first force applying device, applying multiple groups of forces in the negative X-direction on the cubic stress block by controlling the second force applying device, logging a data of a single axis force sensor in the second force applying device and the data of the six-dimensional force sensor, thereby realizing the calibration of the force in the negative X-direction.

Step 2: calibrating a force in a Y-direction, including the following steps:

step 21: adjusting a stress direction of the cubic stress block: resetting the first force applying device and the second force applying device, turning the manipulator so that the Z-direction of the six-dimensional force sensor coincides with the axial direction of the third force applying device and the Y-direction of the six-dimensional force sensor is parallel to the axial direction of the first force applying device; and step 22: calibrating the force in the Y-direction: calibrating the force in the positive Y-direction by controlling the first force applying device with the same method described in the step 13 and step 14; calibrating the force in a negative Y-direction by controlling the second force applying device.

Step 3: calibrating a force in the Z-direction: resetting the first force applying device and the second force applying device, controlling the third force applying device to apply multiple groups of forces in the Z-direction on the cubic stress block while the Z-direction of the six-dimensional force sensor coincides with the axial direction of the third force applying device, logging a data of a single axis force sensor in the third force applying device and the data of the six-dimensional force sensor, thereby realizing the calibration of the force in the Z-direction.

The method further includes the following steps:

Step 4: calibrating a torque around the X-direction, including the following steps:

step 41: mounting the force applying devices: mounting the axis of the first force applying device and the axis of the second force applying device at different heights, and mounting the third force applying device at the center of the top surface of the horizontal plate;

step 42: mounting a cubic stress block: mounting the cubic stress block with the method described in the step 12; at that point, the Y-direction of the six-dimensional force sensor is subjected to be parallel to the axial direction of the first force applying device, and the Z-direction of the six-dimensional force sensor is subjected to coincide with the axial direction of the third force applying device;

step 43: calibrating a torque around the positive X-direction: controlling the first force applying device and the second force applying device to apply multiple groups of forces of equal value on the cubic stress block at the same time, logging the data of the single axis force sensors in the two force applying devices and the data of the six-dimensional force sensor, thereby realizing the calibration of the torque around the positive X-direction; wherein the multiple groups of forces of equal value refer to multiple groups of forces in which the forces applied by the first force applying device and the second force applying device in each group of forces are equal to each other in magnitude;

step 44: calibrating a torque around the negative X-direction: resetting the first force applying device and the second force applying device, turning the six-dimensional force sensor around the Z-axis by 180° or exchanging height positions of the first force applying device and the second force applying device; controlling the first force applying device and the second force applying device again to apply multiple groups of forces of equal value on the cubic stress block at the same time, logging and comparing the data of the single axis force sensors in the two force applying devices and the data of the six-dimensional force sensor, thereby realizing the calibration of the torque around the negative X-direction.

Step 5: calibrating a torque around the Y-direction, including the following steps:

step 51: adjusting the stress direction of the cubic stress block: resetting the first force applying device and the second force applying device, turning the manipulator so that the Z-direction of the six-dimensional force sensor coincides with the axial direction of the third force applying device and the X-direction of the six-dimensional force sensor is parallel to the axial direction of the first force applying device;

step 52: calibrating the torque around the Y-direction: calibrating the torque around the positive Y-direction with the method described in the step 43; calibrating the torque around the negative Y-direction with the method described in the step 44.

Step 6: calibrating a torque around the Z-direction, including the following steps:

step 61: adjusting the stress direction of the cubic stress block: resetting the first force applying device and the second force applying device, turning the manipulator so that the Z-direction of the six-dimensional force sensor is perpendicular to a plane where the axes of the first force applying device, the second force applying device and the third force applying device lie, and the X-direction or Y-direction of the six-dimensional force sensor coincides with the axial direction of the third force applying device;

step 62: calibrating a torque around a positive Z-direction: controlling the first force applying device and the second force applying device to apply multiple groups of forces of equal value on the cubic stress block at the same time, logging and comparing the data of the single axis force sensors in the two force applying devices and the data of the six-dimensional force sensor, thereby realizing the calibration of the torque around the positive Z-direction;

step 63: calibrating a torque around a negative Z-direction: resetting the first force applying device and the second force applying device after the calibration of the torque around the positive Z-direction is finished, turning the six-dimensional force sensor around the Z-axis by 180° or exchanging the height positions of the first force applying device and the second force applying device; controlling the first force applying device and the second force applying device again to apply multiple groups of forces of equal value on the cubic stress block at the same time, logging and comparing the data of the single axis force sensors in the two force applying devices and the data of the six-dimensional force sensor, thereby realizing the calibration of the torque around the negative Z-direction.

In the step 11, the first force applying device is mounted at a mounting position B on the left vertical plate, and the second force applying device is mounted at a mounting position b on the right vertical plate; the axis of the mounting position B and the axis of the mounting position b are at the same height.

In the step 41, the first force applying device is mounted at a mounting position A on the left vertical plate, and the second force applying device is mounted at a mounting position c on the right vertical plate; the axis of the mounting position A is at a height higher than the height of the axis of the mounting position c.

In the step 44, if the calibration of the torque around the negative X-direction is carried out by exchanging the height positions of the first force applying device and the second force applying device, the specific exchanging method is as follows: mounting the first force applying device at a mounting position C on the left vertical plate, and mounting the second force applying device at a mounting position a on the right vertical plate.

The invention has the following benefits:

1. The device provided by the present invention utilizes piezoelectric ceramic plates and high-precision single axis force sensors to generate standard load, so as to realize on-orbit calibration in a weightless environment, and has advantages of large loads and stable force source, etc.

2. The device provided by the present invention has simple structure and small size, and is applicable to the narrow and small environment of a space station.

DESCRIPTION OF THE EMBODIMENTS

The present invention will be further described in detail below with reference to the preferred embodiments and the drawings.

In the description of the present invention, it should be understood that the orientation or position relations indicated by terms "left", "right", "top" and "bottom", etc., are based on the orientation or position relations indicated on the drawings. They are used only to ease and simplify the description of the present invention, instead of indicating or implying that the involved device or component must have a specific orientation or must be constructed and operated in a specific orientation. The terms "first" and "second", etc. do not imply the degree of importance of the components. Therefore, the use of these terms should not be deemed as constituting any limitation to the present invention. The specific dimensions used in the embodiments are only for illustrating the technical solution, but in no way limit the protection scope of the present invention.

As shown in FIG. 3 to FIG. 6, a high-precision and miniaturized on-orbit calibration device for the six-dimensional force sensor of a space station manipulator includes a fixing bracket 15, three force applying devices and a cubic stress block 22.

Figure 3:
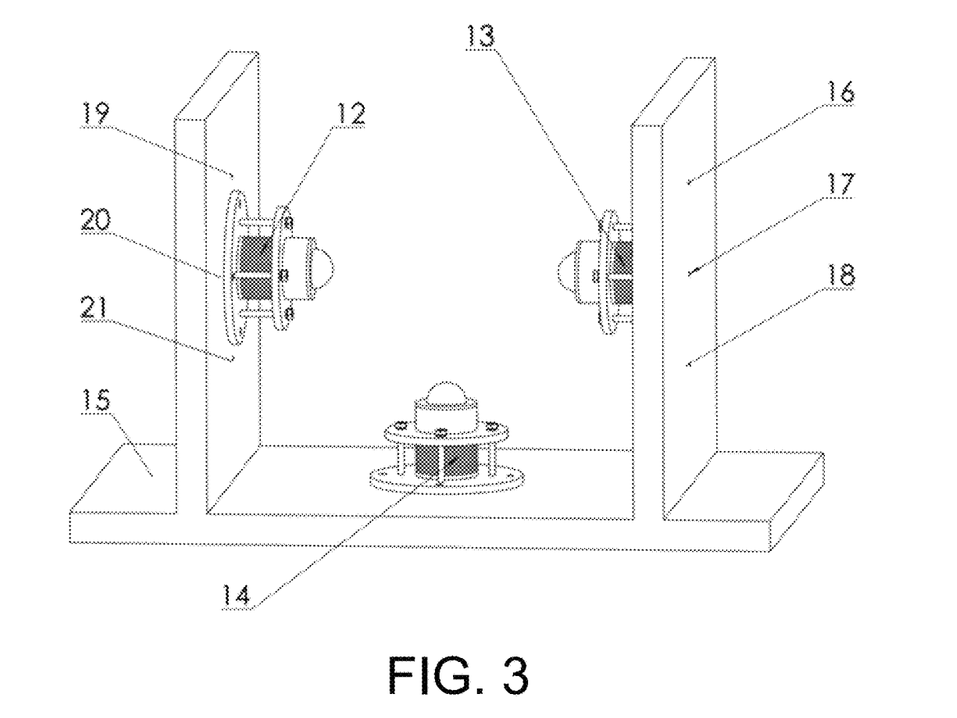
FIG. 3 shows the overall structure of the high-precision and miniaturized on-orbit calibration device for the six-dimensional force sensor of a space station manipulator according to the present invention.

The fixing bracket is in an inverted 7E-shape and includes a horizontal plate and two vertical plates vertically arranged on the horizontal plate. A calibration cavity with a U-shaped longitudinal cross section is formed between the two vertical plates and the horizontal plate.

The two vertical plates are a left vertical plate and a right vertical plate, and each vertical plate is preferably provided with at least two mounting positions for force applying devices at different heights, wherein at least one set of mounting positions for force applying devices on the two vertical plates are at the same height.

In this embodiment, each vertical plate is preferably provided with three mounting positions for force applying devices at different heights.

The mounting positions for the three force applying devices on the left vertical plate are respectively a mounting position A 19, a mounting position B 20 and a mounting position C 21 from top to bottom. The mounting position A, the mounting position B and the mounting position C are preferably in the same vertical line.

The mounting positions for the three force applying devices on the right vertical plate are respectively a mounting position a 16, a mounting position b 17 and a mounting position c 18 from top to bottom. The mounting position a, the mounting position b and the mounting position c are preferably in another vertical line.

The heights of the mounting position a, mounting position b and mounting position c are in one-to-one correspondence with the heights of the mounting position A, mounting position B and mounting position C. For example, the axis of the mounting position a is at the same height as the axis of the mounting position A, and so on.

The three force applying devices are a first force applying device 12, a second force applying device 13 and a third force applying device 14, and all of them are disposed in the calibration cavity. The first force applying device and the second force applying device are arranged on opposite sides of the two vertical plates respectively, and their positions on the corresponding vertical plates can be adjusted in the vertical direction. The third force applying device is arranged at the center of the top surface of the horizontal plate.

Figure 1:
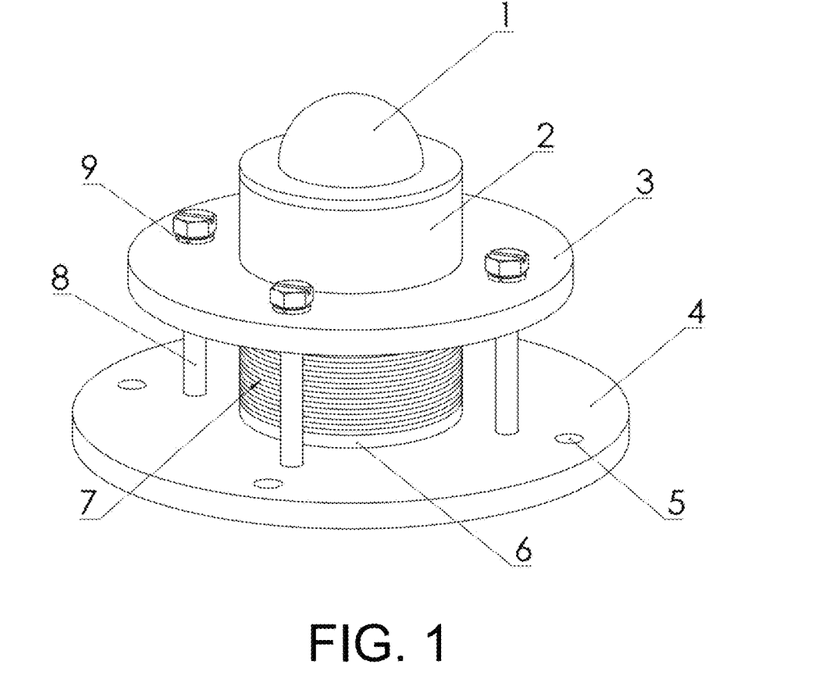
FIG. 1 is a perspective view of the force applying device according to the present invention.
Figure 2:
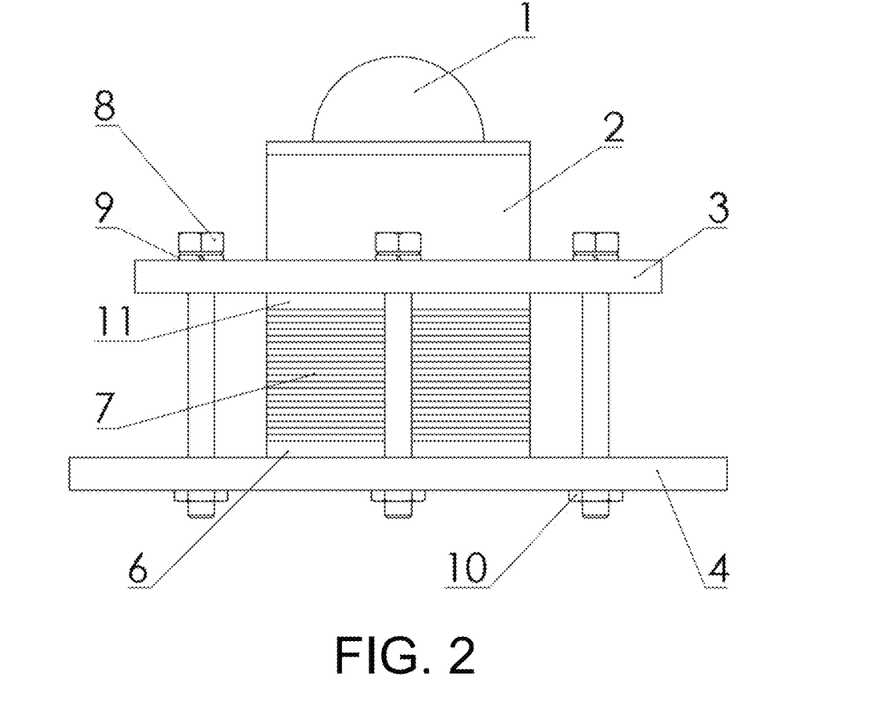
FIG. 2 is a front view of the force applying device according to the present invention.

As shown in FIG. 1 and FIG. 2, each force applying device includes a force applying head 1, a single axis force sensor 2, a force source part and a fastening part.

As shown in FIG. 2, the force source part includes an upper support plate 3, a second electrode plate 11, piezoelectric ceramic plates 7, a first electrode plate 6 and a lower support plate 4, which are coaxially arranged sequentially from top to bottom.

Several connecting holes 5 are distributed evenly on the outer circumference of the lower support plate 4 for mounting and fixing to the fixing bracket.

The upper support plate is mounted on the lower support plate via the fastening part, and the second electrode plate, the piezoelectric ceramic plates and the first electrode plate are elastically compressed between the upper support plate and the lower support plate.

The fastening part preferably includes a bolt 8, a nut 10 and a pre-loaded spring 9. The shank of the bolt passes through the pre-loaded spring, the upper support plate and the lower support plate sequentially from top to bottom, and then is fastened by the nut. The lower support plate is in a threaded connection with the shank of the bolt, the upper support plate is slidably connected to the shank of the bolt, and the preloaded spring is located between the upper support plate and the head of the bolt.

The single axis force sensor is mounted on the center of the top portion of the upper support plate. The precision of the single axis force sensor should be higher than the expected precision of the six-dimensional force sensor by one order of magnitude. Specifically, for example, if the expected precision of the six-dimensional force sensor is 3%, the precision of the single axis force sensor should be higher than 0.3%.

The force applying head is mounted at the center of the top portion of the single axis force sensor, and is preferably hemispherical.

Figure 4:
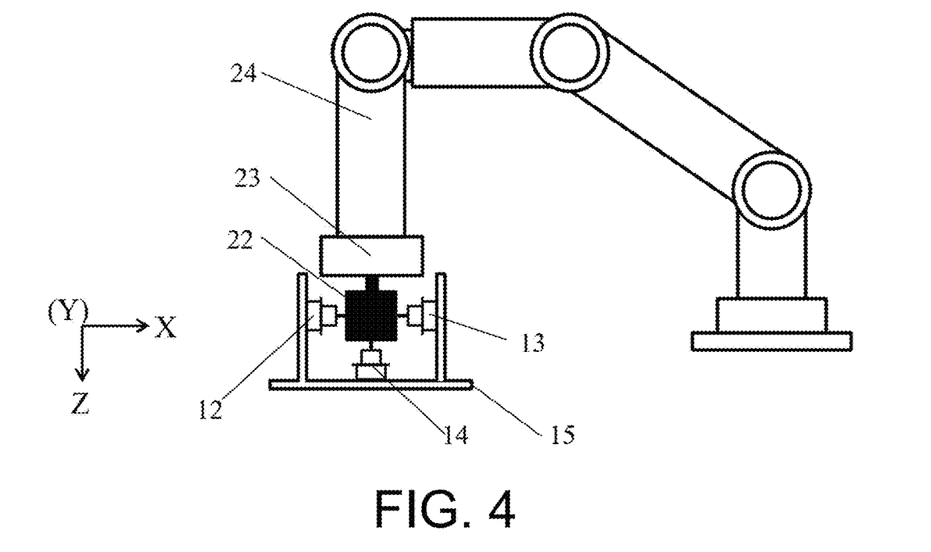
FIG. 4 is a schematic diagram of the attitude of the on-orbit calibration device according to the present invention during the calibration of the forces in the X-direction, Y-direction and Z-direction.
Figure 5:
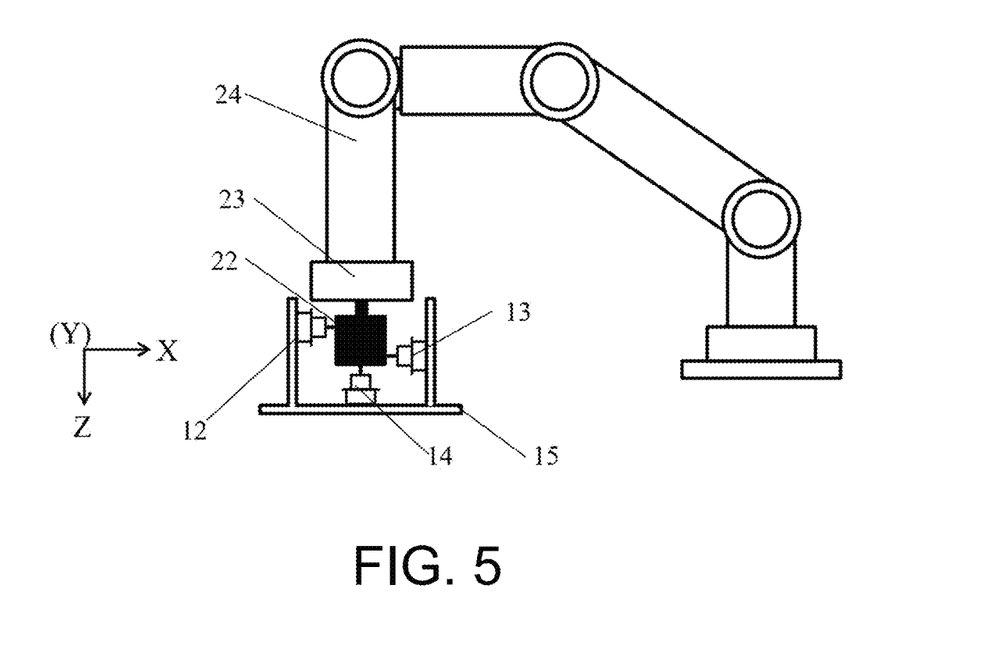
FIG. 5 is a schematic diagram of the attitude of the on-orbit calibration device according to the present invention during the calibration of the torque around the X-direction and Y-direction.
Figure 6:
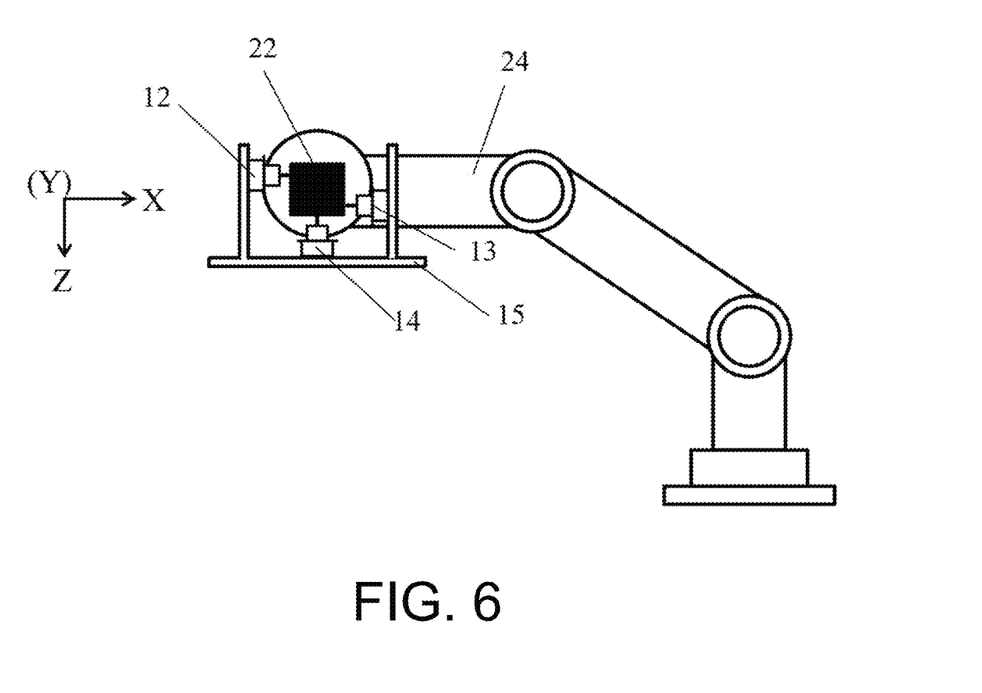
FIG. 6 is a schematic diagram of the attitude of the on-orbit calibration device according to the present invention during the calibration of the torque around the Z-direction.

As shown in FIG. 4 to FIG. 6, a cubic stress block is mounted on the top of the six-dimensional force sensor 23, and the six-dimensional force sensor is mounted at the end of the manipulator 24. The cubic stress block can be driven by the manipulator to extend into the calibration cavity and in contact with the three force applying heads in the three force applying devices.

A high-precision and miniaturized on-orbit calibration method for the six-dimensional force sensor of a space station manipulator, includes the following steps.

Step 1: calibrating the force (Fx) in the X-direction, including the following steps:

Step 11: mounting force applying devices: mounting the axis of a first force applying device and the axis of a second force applying device at the same height, and mounting a third force applying device at the center of the top surface of a horizontal plate. In this embodiment, the first force applying device is preferably mounted at a mounting position B on the left vertical plate, and the second force applying device is preferably mounted at a mounting position b on the right vertical plate. The axis of the mounting position B and the axis of the mounting position b are at the same height. Of course, as an alternative, the first force applying device and the second force applying device may be mounted at the mounting position A and mounting position a respectively or mounted at the mounting position C and mounting position c respectively.

Step 12: mounting a cubic stress block: mounting a cubic stress block on the top of the six-dimensional force sensor, and mounting the six-dimensional force sensor at the end of the manipulator; driving the manipulator so that the cubic stress block extends into a calibration cavity and in contact with the three force applying heads of the three force applying devices. At that point, the X-direction of the six-dimensional force sensor is subjected to be parallel to the axial direction of the first force applying device, and the Z-direction of the six-dimensional force sensor is subjected to coincide with the axial direction of the third force applying device, as shown in FIG. 4.

Step 13: calibrating the force in the positive X-direction: applying multiple groups of forces on the cubic stress block by controlling the first force applying device, logging and comparing the data of the single axis force sensor in the first force applying device and the data of the six-dimensional force sensor, thereby realizing the calibration of the force in the positive X-direction.

The method for applying multiple groups of forces on the cubic stress block with the first force applying device is as follows. Applying a preset voltage between the first electrode plate and the second electrode plate in the first force applying device, so that several piezoelectric ceramic plates between the two electrode plates generate a preset displacement in the positive X-direction which is related with the magnitude of the voltage owing to a piezoelectric effect. Since the force applying head in the first force applying device contacts the cubic stress block, the displacement in the positive X-direction will be transformed into force in the positive X-direction applied on the cubic stress block, and the magnitude of the force in the positive X-direction is related with the magnitude of the voltage. The single axis force sensor in the first force applying device detects and feeds back the applied force in the positive X-direction in real time, and the magnitude of the force in the positive X-direction can be adjusted by controlling the magnitude of the voltage.

The methods for applying multiple groups of forces on the cubic stress block with the second force applying device and the third force applying device subsequently are the same as the method described above.

Step 14: calibrating the force in the negative X-direction: resetting the first force applying device, i.e., the first force applying device 12 is still fixed in the mounting position B20, the second force applying device 13 is still fixed in the mounting position b17, and the attitude in FIG. 4 remains unchanged.

Then, applying multiple groups of forces in the negative X-direction on the cubic stress block by controlling the second force applying device, logging and comparing the data of the single axis force sensor in the second force applying device and the data of the six-dimensional force sensor, thereby realizing the calibration of the force in the negative X-direction.

Step 2: calibrating the force (Fy) in the Y-direction, including the following steps:

Step 21: adjusting the stress direction of the cubic stress block: resetting the first force applying device and the second force applying device, and keeping the height positions unchanged.

Turning the manipulator 24, so that the six-dimensional force sensor 23 rotates by 90 degrees around the Z-axis. At that point, the Z-direction of the six-dimensional force sensor coincides with the axial direction of the third force applying device, and the Y-direction of the six-dimensional force sensor is parallel to the axial direction of the third force applying device.

Step 22: calibrating the force in the Y-direction: calibrating the force in the positive Y-direction by controlling the first force applying device with the same method described in the steps 13 and 14; calibrating the force in the negative Y-direction by controlling the second force applying device.

Step 3: calibrating the force in the Z-direction: resetting the first force applying device and the second force applying device, preferably in the altitude shown in FIG. 4; controlling the third force applying device to apply multiple groups of forces in the Z-direction on the cubic stress block while the Z-direction of the six-dimensional force sensor coincides with the axial direction of the third force applying device, logging and comparing the data of the single axis force sensor in the third force applying device and the data of the six-dimensional force sensor, thereby realizing the calibration of the force in the Z-direction.

The order of calibration of the forces in X-direction, Y-direction and Z-direction can be adjusted as required.

Step 4: calibrating the torque around the X-direction, including the following steps:

Step 41: mounting force applying devices: mounting the axis of the first force applying device and the axis of the second force applying device at different heights, and mounting the third force applying device at the center of the top surface of the horizontal plate.

In this embodiment, the specific mounting method of the first force applying device and the second force applying device is preferably as follows: as shown in FIG. 5, the first force applying device is mounted at a mounting position A on the left vertical plate, and the second force applying device is mounted at a mounting position c on the right vertical plate. The axis of the mounting position A is at a height higher than the height of the axis of the mounting position c.

Step 42: mounting a cubic stress block: mounting the cubic stress block with the method described in the step 12. At that point, the Y-direction of the six-dimensional force sensor is subjected to be parallel to the axial direction of the first force applying device, and the Z-direction of the six-dimensional force sensor is subjected to coincide with the axial direction of the third force applying device.

Step 43: calibrating the torque around the positive X-direction: controlling the first force applying device and the second force applying device to apply multiple groups of forces of equal value on the cubic stress block at the same time, logging the data of the single axis force sensors in the two force applying devices and the data of the six-dimensional force sensor, thereby realizing the calibration of the torque around the positive X-direction. The multiple groups of forces of equal value refer to multiple groups of forces, in which the forces applied by the first force applying device and the second force applying device in each group of forces are equal to each other in magnitude.

Since the two force applying devices apply forces in the same magnitude, the moment can be obtained by multiplying the data of the single axis force sensor in either of the force applying devices by the distance between the two force applying heads in the Z-direction.

Step 44: calibrating the torque around the negative X-direction: resetting the first force applying device and the second force applying device, turning the six-dimensional force sensor around the Z-axis by 180° or exchanging the height positions of the first force applying device and the second force applying device.

If the calibration of the torque around the negative X-direction is carried out by exchanging the height positions of the first force applying device and the second force applying device, preferably the specific exchanging method is as follows: mounting the first force applying device at a mounting position C on the left vertical plate, and mounting the second force applying device at a mounting position a on the right vertical plate.

Controlling the first force applying device and the second force applying device again to apply multiple groups of forces of equal value on the cubic stress block at the same time, logging and comparing the data of the single axis force sensors in the two force applying devices and the data of the six-dimensional force sensor, thereby realizing the calibration of the torque around the negative X-direction.

Step 5: calibrating the torque around the Y-direction, including the following steps:

Step 51: adjusting the stress direction of the cubic stress block: resetting the first force applying device and the second force applying device, turning the manipulator around the Z-axis of the six-dimensional force sensor by 90°, so that the Z-direction of the six-dimensional force sensor coincides with the axial direction of the third force applying device and the X-direction of the six-dimensional force sensor is parallel to the axial direction of the first force applying device. The attitude after the adjustment is also shown in FIG. 5, specifically, the first force applying device is mounted at a mounting position A on the left vertical plate, and the second force applying device is mounted at a mounting position c on the right vertical plate.

Step 52: calibrating the torque around the Y-direction: calibrating the torque around the positive Y-direction with the method described in the step 43; calibrating the torque around the negative Y-direction with the method described in the step 44.

Step 6: calibrating the torque around the Z-direction, including the following steps:

Step 61: adjusting the stress direction of the cubic stress block: resetting the first force applying device and the second force applying device. At that point, the first force applying device is mounted at the mounting position A on the left vertical plate and the second force applying device is mounted at the mounting position c on the right vertical plate; turning the manipulator around the X-axis or Y-axis of the six-dimensional mechanical sensor by 90°, so that the Z-direction of the six-dimensional force sensor is perpendicular to a plane where the axes of the first force applying device, the second force applying device and the third force applying device lie, and the X-direction or Y-direction of the six-dimensional force sensor coincides with the axial direction of the third force applying device.

Step 62: calibrating the torque around the positive Z-direction: controlling the first force applying device and the second force applying device to apply multiple groups of forces of equal value on the cubic stress block at the same time, logging and comparing the data of the single axis force sensors in the two force applying devices and the data of the six-dimensional force sensor, thereby realizing the calibration of the torque around the positive Z-direction.

Step 63: calibrating the torque around the negative Z-direction: resetting the first force applying device and the second force applying device after the calibration of the torque around the positive Z-direction is finished, turning the six-dimensional force sensor around the Z-axis by 180° or exchanging the height positions of the first force applying device and the second force applying device.

If the calibration of the torque around the negative Z-direction is carried out by exchanging the height positions of the first force applying device and the second force applying device, preferably the specific exchanging method is as follows: mounting the first force applying device at a mounting position C on the left vertical plate, and mounting the second force applying device at a mounting position a on the right vertical plate.

Controlling the first force applying device and the second force applying device again to apply multiple groups of forces of equal value on the cubic stress block at the same time, logging and comparing the data of the single axis force sensors in the two force applying devices and the data of the six-dimensional force sensor, thereby realizing the calibration of the torque around the negative Z-direction.

The above calibration process is only one of the preferred solutions, and can be adjusted according to the specific requirement.

The preferred embodiments of the present invention are described above in detail; however, the present invention is not limited to the details in the above-mentioned embodiments. Those skilled in the art can make equivalent modifications to the technical solution of the present invention, within the scope of the technical concept of the present invention. However, all those modifications shall be deemed as falling into the protection scope of the present invention.

What is claimed is:

1. A high-precision and miniaturized on-orbit calibration device for a six-dimensional force sensor of a space station manipulator, the on-orbit calibration device comprising a fixing bracket, three force applying devices, and a cubic stress block, wherein the fixing bracket is in an inverted g-shape and comprises a horizontal plate two vertical plates vertically arranged on the horizontal plate, and a calibration cavity with a U-shaped longitudinal cross section that is formed between the two vertical plates and the horizontal plate;

the three force applying devices are respectively a first force applying device, a second force applying device and a third force applying device, which are all disposed in the calibration cavity; the first force applying device and the second force applying device are arranged on opposite sides of the two vertical plates respectively, and height positions of the first force applying device and the second force applying device on the corresponding vertical plates is adjustable; the third force applying device is arranged at a center of a top surface of the horizontal plate;

each force applying device comprises a force applying head, a single axis force sensor, a force source part and a fastening part;

the force source part comprises an upper support plate, a second electrode plate, piezoelectric ceramic plates, a first electrode plate and a lower support plate, which are coaxially arranged sequentially from top to bottom; the upper support plate is mounted on the lower support plate via the fastening part, and the second electrode plate, the piezoelectric ceramic plates and the first electrode plate are elastically compressed between the upper support plate and the lower support plate;

the single axis force sensor is mounted at a center of a top portion of the upper support plate, and the force applying head is mounted at a center of a top portion of the single axis force sensor and is hemispherical; and the cubic stress block is mounted on a top portion of the six-dimensional force sensor, and a bottom portion of the six-dimensional force sensor is mounted at an end of the manipulator, such that the cubic stress block is able to be driven by the manipulator to extend into the calibration cavity and to be in contact with the three force applying heads in the three force applying devices; a precision of the single axis force sensor is higher than a precision of the six-dimensional force sensor.

2. The high-precision and miniaturized on-orbit calibration device for the six-dimensional force sensor of a space station manipulator according to claim 1, each vertical plate is provided with at least two mounting positions for the force applying devices at different heights, wherein at least one set of the mounting positions for the force applying devices on the two vertical plates are at a same height.

3. The high-precision and miniaturized on-orbit calibration device for the six-dimensional force sensor of a space station manipulator according to claim 2, each vertical plate is provided with three mounting positions for force applying devices at different heights; the two vertical plates are respectively a left vertical plate and a right vertical plate, and the three mounting positions for the force applying devices on the left vertical plate are a mounting position A, a mounting position B and a mounting position C from top to bottom; the three mounting positions for the force applying devices on the right vertical plate are a mounting position a, a mounting position b, and a mounting position c from top to bottom; wherein the mounting position A, the mounting position B and the mounting position C are in a same vertical line, while the mounting position a, the mounting position b and the mounting position c are in another vertical line; heights of the mounting position a, mounting position b and mounting position c are in one-to-one correspondence with heights of the mounting position A, mounting position B and mounting position C.

4. The high-precision and miniaturized on-orbit calibration device for the six-dimensional force sensor of a space station manipulator according to claim 1, wherein the fastening part comprises a bolt, a nut and a pre-loaded spring; a shank of the bolt passes through the pre-loaded spring, the upper support plate and the lower support plate sequentially from top to bottom, and then is fastened by the nut; the lower support plate is in a threaded connection with the shank of the bolt, the upper support plate is slidably connected to the shank of the bolt, and the preloaded spring is located between the upper support plate and a head of the bolt.

5. A high-precision and miniaturized on-orbit calibration method for a six-dimensional force sensor of a space station manipulator, the on-orbit calibration method comprising the following steps:
    step 1: calibrating a force in an X-direction, comprising the following steps:
        step 11: mounting force applying devices on a fixing bracket which is in an inverted π-shape and comprises a horizontal plate, two vertical plates vertically arranged on the horizontal plate, and a calibration cavity with a U-shaped longitudinal cross section that is formed between the two vertical plates and the horizontal plate, wherein the force applying devices comprises a first force applying device, a second force applying device and a third force applying device that are to be mounted in the calibration cavity by the step 11, wherein the first force applying and the second force applying device are to be mounted on opposite sides of the two vertical plates, such that an axis of the first force applying device and an axis of the second force applying device are at a same height, and the third force applying device is to be mounted at a center of a top surface of the horizontal plate;
        step 12: mounting a cubic stress block: mounting the cubic stress block on a top of the six-dimensional force sensor, and mounting a bottom portion of the six-dimensional force sensor at an end of the manipulator; driving the manipulator so that the cubic stress block extends into a calibration cavity and becomes in contact with three force applying heads of the three force applying devices; wherein, the X-direction of the six-dimensional force sensor is subjected to be parallel to an axial direction of the first force applying device, and a Z-direction of the six-dimensional force sensor is subjected to coincide with an axial direction of the third force applying device;
        step 13: calibrating a force in a positive X-direction: applying multiple groups of forces on the cubic stress block by controlling the first force applying device, logging a data of a single axis force sensor in the first force applying device and a data of the six-dimensional force sensor, such that the calibration of the force in the positive X-direction is realized; wherein, a method for applying multiple groups of forces on the cubic stress block with the first force applying device is as follows: applying a preset voltage between a first electrode plate and a second electrode plate in the first force applying device, owing to a piezoelectric effect, several piezoelectric ceramic plates between the first and second electrode plates generate a preset displacement in the positive X-direction which is related with a magnitude of the voltage; since the force applying head in the first force applying device contacts the cubic stress block, the displacement in the positive X-direction is transformed into the force in the positive X-direction applied on the cubic stress block, and a magnitude of the force in the positive X-direction is related with the magnitude of the voltage; the single axis force sensor in the first force applying device detects and feeds back the applied force in the positive X-direction in real time, and the magnitude of the force in the positive X-direction is adjustable by controlling the magnitude of the voltage; and
        step 14: calibrating a force in a negative X-direction: resetting the first force applying device, applying multiple groups of forces in the negative X-direction on the cubic stress block by controlling the second force applying device, logging a data of a single axis force sensor in the second force applying device and the data of the six-dimensional force sensor, such that the calibration of the force in the negative X-direction is realized;
    step 2: calibrating a force in a Y-direction, comprising the following steps:
        step 21: adjusting a stress direction of the cubic stress block: resetting the first force applying device and the second force applying device, turning the manipulator so that the Z-direction of the six-dimensional force sensor coincides with the axial direction of the third force applying device, and the Y-direction of the six-dimensional force sensor is parallel to the axial direction of the first force applying device; and
        step 22: calibrating the force in the Y-direction: calibrating the force in the positive Y-direction by controlling the first force applying device as described in the step 13 and step 14; calibrating the force in a negative Y-direction by controlling the second force applying device;
    step 3: calibrating a force in the Z-direction: resetting the first force applying device and the second force applying device, controlling the third force applying device to apply multiple groups of forces in the Z-direction on the cubic stress block while the Z-direction of the six-dimensional force sensor coincides with the axial direction of the third force applying device, logging a data of a single axis force sensor in the third force applying device and the data of the six-dimensional force sensor, such that the calibration of the force in the Z-direction is realized.

6. The high-precision and miniaturized on-orbit calibration method for the six-dimensional force sensor of a space station manipulator according to claim 5, the on-orbit calibration method further comprising the following steps:
    step 4: calibrating a torque around the X-direction, comprising the following steps:
        step 41: mounting the force applying devices: mounting the axis of the first force applying device and the axis of the second force applying device at different heights, and mounting the third force applying device at the center of the top surface of the horizontal plate;
        step 42: mounting a cubic stress block: mounting the cubic stress block as described in the step 12: wherein, the Y-direction of the six-dimensional force sensor is subjected to be parallel to the axial direction of the first force applying device, and the Z-direction of the six-dimensional force sensor is subjected to coincide with the axial direction of the third force applying device;

step 43: calibrating a torque around the positive X-direction: controlling the first force applying device and the second force applying device to apply multiple groups of forces of equal value on the cubic stress block at the same time, logging the data of the single axis force sensors in the first and second force applying devices and the data of the six-dimensional force sensor, such that the calibration of the torque around the positive X-direction is realized; wherein the multiple groups of forces of equal value refer to multiple groups of forces, in which the forces applied by the first force applying device and the second force applying device in each group of forces are equal to each other in magnitude; and step 44: calibrating a torque around the negative X-direction: resetting the first force applying device and the second force applying device, turning the six-dimensional force sensor around the Z-axis by 180° or exchanging height positions of the first force applying device and the second force applying device; controlling the first force applying device and the second force applying device again to apply multiple groups of forces of equal value on the cubic stress block at the same time, logging and comparing the data of the single axis force sensors in the first and second force applying devices and the data of the six-dimensional force sensor, such that the calibration of the torque around the negative X-direction is realized;

step 5: calibrating a torque around the Y-direction, comprising the following steps:

step 51: adjusting the stress direction of the cubic stress block: resetting the first force applying device and the second force applying device, turning the manipulator so that the Z-direction of the six-dimensional force sensor coincides with the axial direction of the third force applying device and the X-direction of the six-dimensional force sensor is parallel to the axial direction of the first force applying device; and step 52: calibrating the torque around the Y-direction: calibrating the torque around the positive Y-direction as described in the step 43; calibrating a torque around the negative Y-direction as described in the step 44;

step 6: calibrating a torque around the Z-direction, comprising the following steps:

step 61: adjusting the stress direction of the cubic stress block: resetting the first force applying device and the second force applying device, turning the manipulator so that the Z-direction of the six-dimensional force sensor is perpendicular to a plane where the axes of the first force applying device, the second force applying device and the third force applying device lie, and the X-direction or Y-direction of the six-dimensional force sensor coincides with the axial direction of the third force applying device;

step 62: calibrating a torque around a positive Z-direction: controlling the first force applying device and the second force applying device to apply multiple groups of forces of equal value on the cubic stress block at the same time, logging and comparing the data of the single axis force sensors in the first and second force applying devices and the data of the six-dimensional force sensor, such that the calibration of the torque around the positive Z-direction is realized; and step 63: calibrating a torque around a negative Z-direction: resetting the first force applying device and the second force applying device after the calibration of the torque around the positive Z-direction is finished, turning the six-dimensional force sensor around the Z-axis by 180° or exchanging the height positions of the first force applying device and the second force applying device; controlling the first force applying device and the second force applying device again to apply multiple groups of forces of equal value on the cubic stress block at the same time, logging and comparing the data of the single axis force sensors in the first and second force applying devices and the data of the six-dimensional force sensor, such that the calibration of the torque around the negative Z-direction is realized.

7. The high-precision and miniaturized on-orbit calibration method for the six-dimensional force sensor of a space station manipulator according to claim 6, wherein in the step 11, the first force applying device is mounted at a mounting position B on a left vertical plate, and the second force applying device is mounted at a mounting position b on a right vertical plate; an axis of the mounting position B and an axis of the mounting position b are at a same height.

8. The high-precision and miniaturized on-orbit calibration method for the six-dimensional force sensor of a space station manipulator according to claim 7, wherein in the step 41, the first force applying device is mounted at a mounting position A on the left vertical plate, and the second force applying device is mounted at a mounting position c on the right vertical plate; an axis of the mounting position A is at a height higher than a height of an axis of the mounting position c.

9. The high-precision and miniaturized on-orbit calibration method for the six-dimensional force sensor of a space station manipulator according to claim 8, wherein in the step 44, if the calibration of the torque around the negative X-direction is carried out by exchanging the height positions of the first force applying device and the second force applying device, the specific exchanging method is as follows: mounting the first force applying device at a mounting position C on the left vertical plate, and mounting the second force applying device at a mounting position a on the right vertical plate.

* * * * *